United States Patent
Lerman et al.

(10) Patent No.: US 8,494,907 B2
(45) Date of Patent: Jul. 23, 2013

(54) SYSTEMS AND METHODS FOR INTERACTION PROMPT INITIATED VIDEO ADVERTISING

(75) Inventors: David Ross Lerman, San Francisco, CA (US); Troy Young, San Francisco, CA (US); Matthew Allen Sanchez, San Francisco, CA (US)

(73) Assignee: SAY Media, Inc., San Francisco, CA (US)

( * ) Notice: Subject to any disclaimer, the term of this patent is extended or adjusted under 35 U.S.C. 154(b) by 1525 days.

(21) Appl. No.: 11/781,830

(22) Filed: Jul. 23, 2007

(65) Prior Publication Data

US 2008/0021775 A1 Jan. 24, 2008

Related U.S. Application Data

(60) Provisional application No. 60/820,077, filed on Jul. 21, 2006.

(51) Int. Cl.
*G06Q 30/00* (2012.01)
*G05B 19/418* (2006.01)

(52) U.S. Cl.
USPC ........................................ 705/14.73; 725/18

(58) Field of Classification Search
USPC .......................................................... 725/18
See application file for complete search history.

(56) References Cited

U.S. PATENT DOCUMENTS

| | | | |
|---|---|---|---|
| 5,848,396 A | 12/1998 | Gerace | |
| 5,935,004 A | 8/1999 | Tarr et al. | |
| 6,385,591 B1 | 5/2002 | Mankoff | |
| 6,553,178 B2 | 4/2003 | Abecassis | |
| 6,690,481 B1 | 2/2004 | Yeung et al. | |
| 7,188,085 B2 | 3/2007 | Pelletier | |
| 7,213,005 B2 | 5/2007 | Mourad et al. | |
| 2001/0052000 A1 | 12/2001 | Giacalone, Jr. | |
| 2002/0067730 A1 | 6/2002 | Hinderks et al. | |
| 2002/0077900 A1 * | 6/2002 | Thompson et al. | 705/14 |
| 2002/0078456 A1 | 6/2002 | Hudson et al. | |
| 2003/0117433 A1 | 6/2003 | Milton et al. | |
| 2003/0120541 A1 * | 6/2003 | Siann et al. | 705/14 |
| 2004/0015398 A1 | 1/2004 | Hayward | |
| 2005/0137958 A1 | 6/2005 | Huber et al. | |
| 2005/0138656 A1 * | 6/2005 | Moore et al. | 725/45 |
| 2005/0267813 A1 | 12/2005 | Monday | |
| 2006/0173974 A1 * | 8/2006 | Tang | 709/217 |
| 2007/0124756 A1 * | 5/2007 | Covell et al. | 725/18 |

FOREIGN PATENT DOCUMENTS

| | | | |
|---|---|---|---|
| WO | 9741673 A2 | 11/1997 | |
| WO | 0038428 A1 | 6/2000 | |
| WO | 0203706 A1 | 1/2002 | |

OTHER PUBLICATIONS

Lenel Systems International, Inc., Newswire. Mar. 12, 1996.*
The interactive living revolution. (Interactive Living). (interactive television still shows potential) Shaw, Russell Broadcasting & Cable, v 133, n 13, p. 3A(8) Mar. 31, 2003.

* cited by examiner

*Primary Examiner* — Victoria Vanderhorst
(74) *Attorney, Agent, or Firm* — KPPB LLP

(57) ABSTRACT

Systems and methods for interaction prompt initiated video advertising are disclosed. According to one embodiment, a computer implemented method comprises storing digital advertising content, the digital content including digital video, and digital slideshows. An XML file is served from an ad server to a player embedded in a web site. One or more advertisements are dynamically generated from the XML file and the digital content. The one or more advertisements are displayed with video content requested through the web site.

13 Claims, 6 Drawing Sheets

SYSTEMS AND METHODS FOR INTERACTION PROMPT INITIATED VIDEO ADVERTISING

The present application claims the benefit of and priority to U.S. Application No. 60/820,077 entitled "System And Method For Interaction Prompt Initiated Video Advertising" filed on Jul. 21, 2006, which is incorporated herein by reference.

TECHNICAL FIELD

The field of the invention relates generally to computer systems and more particularly relates to systems and methods for interaction prompt initiated video advertising.

BACKGROUND

Internet users have begun interacting with the web in new ways. No longer limited to simply browsing for information, people are using the Internet to auction collectibles, sell cars and houses, share photos with their families and friends, meet new friends, romantic interests, share many elements of their lives with others by posting text, photos, graphics and, increasingly, video online. However, online communities and services that provide video sharing features for users often find that users consume much higher levels of storage space and bandwidth when they use video features because files containing video information are generally much larger than most other files posted and viewed by internet users.

As more people gain access to broadband Internet connections and video-enabled digital cameras and cell phones, they will want to incorporate rich media into these interactions. While today Internet users are uploading still photos, in the future they will upload home videos to share with friends, walking tours to accompany their real estate listings, and videos to augment their online dating profiles.

One of the principal barriers to this interactive multi-media future is the complexity of putting digital video on the web. Uploading video requires a technical understanding of video formats and codecs, encoders, players, and streaming servers. The average Internet user simply does not understand the intricacies of preparing a video for the web. There exists a need to improve a user's ability to post and view video.

Internet communities and services often provide posting and sharing features free-of-charge. They support their services by placing advertising within their websites. In order to support the costs incurred while providing relatively more expensive video features, advertising can be placed in association with the video content. Many forms of advertising require users to watch advertising messages before a video (pre-roll), in the middle of a video or series of videos (interstitial) or after a video (post-roll). These advertising forms are often resented by users for their intrusiveness. There exists a need to improve the presentation of advertising messages associated with internet videos.

SUMMARY

Systems and methods for interaction prompt initiated video advertising are disclosed. According to one embodiment, a computer implemented method comprises storing digital advertising content, the digital content including digital video, and digital slideshows. An XML file is served from an ad server to a player embedded in a web site. One or more advertisements are dynamically generated from the XML file and the digital content. The one or more advertisements are displayed with video content requested through the web site.

The above and other preferred features, including various novel details of implementation and combination of elements, will now be more particularly described with reference to the accompanying drawings and pointed out in the claims. It will be understood that the particular methods and systems described herein are shown by way of illustration only and not as limitations. As will be understood by those skilled in the art, the principles and features described herein may be employed in various and numerous embodiments without departing from the scope of the teachings herein.

BRIEF DESCRIPTION OF THE DRAWINGS

The accompanying drawings, which are included as part of the present specification, illustrate the presently preferred embodiment of the present invention and together with the general description given above and the detailed description of the preferred embodiment given below serve to explain and teach the principles of the present invention.

DETAILED DESCRIPTION

Figure 1:
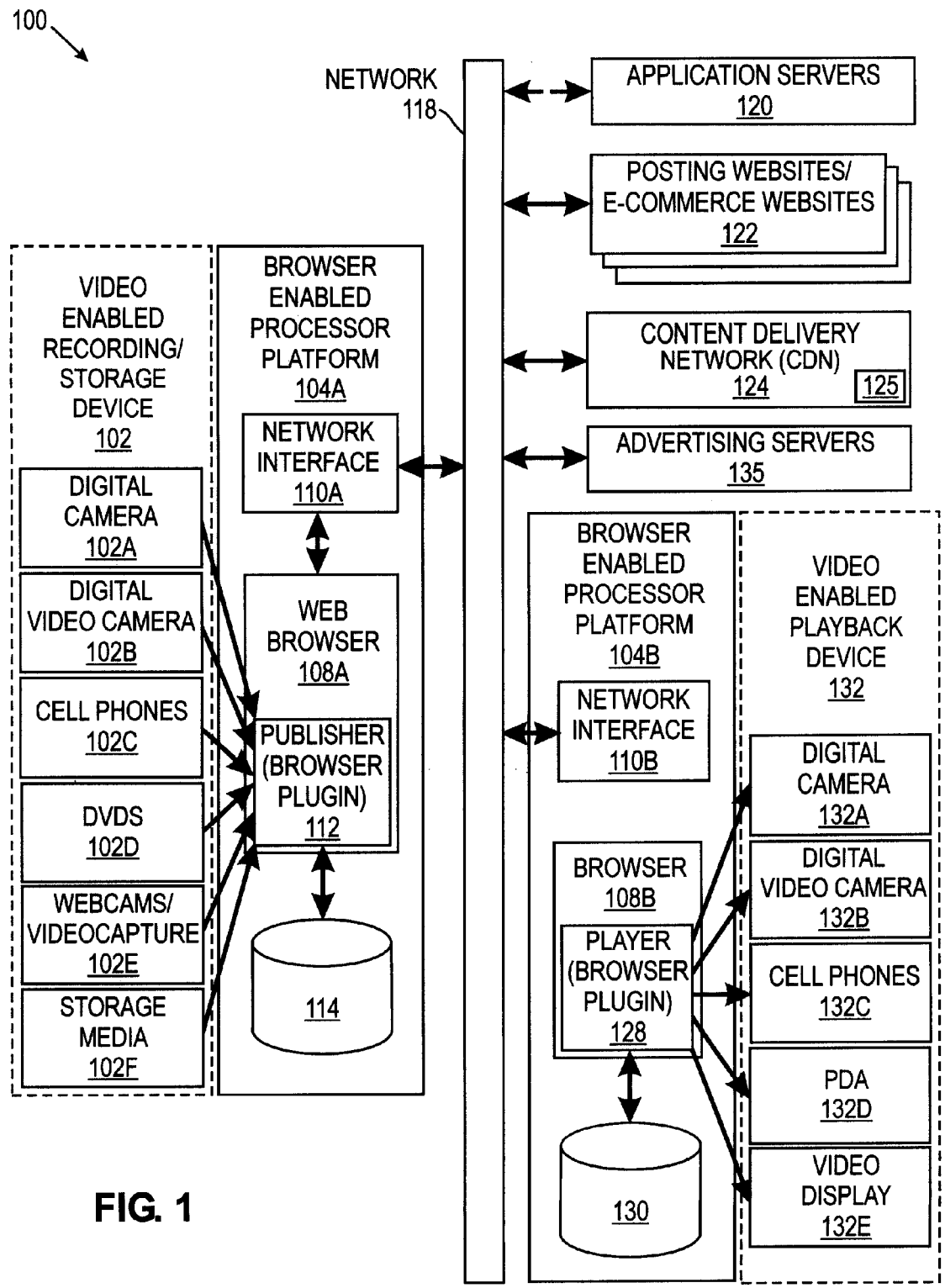
FIG. 1 illustrates a block diagram of a browser enabled video manipulation and posting facility 100 with video advertising, according to one embodiment.

Systems and methods for interaction prompt initiated video advertising are disclosed. According to one embodiment, a computer implemented method comprises storing digital advertising content, the digital content including digital video, and digital slideshows. An XML file is served from an ad server to a player embedded in a web site. One or more advertisements are dynamically generated from the XML file and the digital content. The one or more advertisements are displayed with video content requested through the web site.

In the following description, for purposes of explanation, specific nomenclature is set forth to provide a thorough understanding of the various inventive concepts disclosed herein. However, it will be apparent to one skilled in the art that these specific details are not required in order to practice the various inventive concepts disclosed herein.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories, random access memories, EPROMs, EEPROMs, magnetic or optical cards, or any type of media suitable for storing electronic instructions, and each coupled to a computer system bus.

The methods presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

According to one embodiment, the system provides video extraction, manipulation, posting and other related functions through a network user interface (e.g., browser 108) application. The integration of the video functions into the network user interface provides many advantages to a user who wants to ultimately post his videos onto websites 122. The invention described herein provides a simple means of posting a video file to the Internet to anyone familiar with the use of a browser 108. No knowledge of video file formats or Internet protocols is required. In embodiments, the user merely performs a one-time installation of plug-in software to their browser 108, enabling them to drag-and-drop video files for immediate extraction, or edit and post a video file to a website 122 or other location accessible through the network user interface.

FIG. 1 illustrates a block diagram of a browser enabled video manipulation and posting facility 100 with video advertising, according to one embodiment. The browser enabled video manipulation and posting facility 100 may include a browser enabled processor platform 104A (e.g., a personal computer or laptop computer) and the browser enabled processor platform 104A may be operating a web browser facility 108A. With this configuration, the user of the browser enabled processor platform 104A may interact with a variety of networks 118, network locations 122 (e.g., websites), advertising server(s) 135, and local applications (e.g. the publisher 112). A video manipulation and posting publisher 112 may be directly associated with a network browser facility 108A and these software components may operate on the browser enabled processor platform 104A. The publisher 112 may be configured as a browser plug-in or other form of software component that is adapted to be directly associated with a browser application 108A. The publisher 112 may be a downloadable software component or it may be delivered to the user of the browser enabled processor platform 104A in any number of other ways (e.g., delivered from a CD, DVD, memory stick, portable memory, FTP transfer, etc.). Once the publisher 112 is presented on the browser enabled processor platform 104A, it may be installed in such a way that its functionalities (e.g., extracting video files from video sources, editing video, converting video files to playback formats, posting video to network locations, and other such functionality as described herein) are presented to a user through a user interface 110 associated with the browser 108A. This configuration allows a user to interact with network locations 122 through the browser interface and then interact with any of the publisher's 112 functionalities through the same user interface. In embodiments, the publisher 112 may also access a hard drive, database 114, or other storage facility for the storing of video files or the retrieval of video files.

While the browser enabled processor platform 104A may be a standalone facility, with respect to some of the other facilities in the manipulation and posting facility, in embodiments, the browser enabled processor platform 104A may be directly associated with a video enabled recording/storage device 102. For example, the browser enabled processor platform 104A may be integrated into a digital camera 102A such that a user of the digital camera 102A can interact with a network 118 for the purpose of manipulating and posting a video file. According to one embodiment, network 118 is described as being the Internet, alternatively, the network 118 may be a Wide Area Network (WAN), a Local Area Network (LAN), or any other system of interconnections enabling two or more devices to exchange information. Further, the network 118 may include a wireless network, such that one or more of processor platforms 104 may be wireless devices.

The publisher 112 may be adapted to interact with one or more types of video enabled recording/storage devices 102. The publisher 112 may be adapted to extract video files from video enabled recording/storage devices 102, and/or the publisher 112 may be adapted to perform functions associated with the video enabled recording/storage devices 102. A user of the browser enabled processor platform 104A may make a data connection between a video enabled recording/storage device 102 and the publisher 112 to extract a video file, manipulate the video file, control the video enabled recording/storage device 102, or other video transfer process.

Once the publisher 112 has extracted a video file from a video enabled recording/storage device 102, the publisher 112 maybe used to edit the video file, manipulate the video file, convert the video file to an acceptable format (e.g., a streaming format) for posting to a network location 122, or otherwise prepare the file for posting to a network location 122. The publisher 112 may then connect to a network 118 through a network interface 110A that is associated with the browser enabled processor facility 104A to connect to a network 118. The publisher 112 may then post the video file to a network location 122 (e.g., a website or webpage).

The browser enabled processor platform 104A may enable an interconnection to a video enabled recording/storage device 102 that may or may not be an integral part of the browser enabled processor platform 104A. The user, through a drag-and-drop interface within publisher 112, may transfer video files to the publisher 112. The publisher 112 may then automatically transcode the video files into a common file format for network posting (e.g., a streaming format), which readies the video file for posting to a network location 122 (e.g., the Internet). The user may choose to edit the video file prior to posting to the Internet where the user would utilize familiar VCR/DVR-type controls, and video editing tools. For uplink to the network location 122, the publisher 112 interfaces with a network 118 through the web browser 108 via the network interface 110A. Video files are then passed from the publisher 112 to the content delivery network 124 across the network 118. An application server(s) 120 may assist the data transfer between the user's publisher 112 and the content delivery network 124 where the video files will be stored. In other embodiments, the data transfer may occur without the use of an application server(s) 120. Video files stored on the content delivery network 124 may be linked to a network location 122 (e.g., a personal website, professional website, enterprise website, myspace.com website, auction website, reverse auction website, advertisement website, classified advertisement website, auto website, rental website, real estate web site, other forms of e-commerce websites, or other networked user resource locations) to provide access, viewing and streaming/downloading to other people desiring to interact with the linked video.

A user interested in interacting with the linked video may interact with the video files on the content delivery network 124 and view the video file through the player 128. In embodiments, the 'viewing' user may view the video through a streaming video player, a sequenced video player, a progressive download video player or other video player. In embodiments, the 'viewing' user may interact with the video file posted on the content delivery network 124 by downloading or copying the file to the user's computing/viewing platform. In embodiments, the application server(s) 120 may offer a download of the player 128 for users that have not previously viewed a video.

Advertising servers 135 may serve many different purposes. For example, according to one embodiment advertising server 135 provides advertising content to content delivery network 124, so that advertisements may be provided along with video content. Advertising server 135 maybe part of content delivery network 124, or an independent server. According to one embodiment, advertising server 135 collects advertising content from various advertisers. Advertising server 135 may also receive information from the content delivery network 124 pertaining to the users who view content through the content delivery network 124. The content delivery network 124 collects information about the user such as the user's age, location, gender, income, education, ethnicity, product preferences and a variety of other demographic characteristics that are useful in matching an advertisement to a user. The content delivery network 124 also collects information about the user's viewing experience such as the location of player 128, the genre of the content viewed, the type of content viewed (e.g., video, slideshow, widget), and the location of the player 128 within the browser. The aggregated advertising information can then be transferred to various advertisers, often time advertisers will pay for this aggregated information. According to one embodiment, the information is passed from the content delivery network 124 to the advertising server 135 once a user begins to watch content on the player 128. The website that provides the video player 128 also includes code to pass the user's information to the content delivery network and advertising server 124.

A user choosing to interact with a video file that was posted on the content delivery network 124 may use his own browser enabled processor platform 104B equipped with a network browsing facility 108B, network interface 110B and player 128 to connect to the video file by interacting with a link or other such connection facility associated with a network location 122 (e.g., a website or page as described elsewhere herein).

The player 128 may be a proprietary player or any other video player because the advertising capabilities described herein is independent of the player. The player 128 requires no plugin, according to one embodiment, and may operate as a Flash player. Other players are also envisioned and require other plug-in technology (e.g. Windows Media, Real Player or QuickTime). The player 128 may be adapted as a browser plug-in that is adapted to become directly associated or integrated with the browser application 108B The user's browser enabled processor platform 104B may be checked to see if it already has the proper player 128 installed and if it does not, the user may be provided an option to install one, or it may occur automatically or in some of fashion.

While the browser enabled processor platform 104B may be a standalone computing system such as a desktop, laptop computer, or the like. In embodiments, the browser enabled processor platform 104B may be integrated into a video enabled playback device 132. For example, a digital camera 132A, digital video camera 132B, cell phone 132C, PDA 132D, or other video display facility 132E may be directly associated with (e.g., integrated with) the browser enabled processor platform 104B. A user may use a video enabled playback device 132 to view, download, copy, manipulate, control or otherwise interact with a video file posted on the content delivery network 124 by connecting to it through the linked network location 122.

Figure 2:
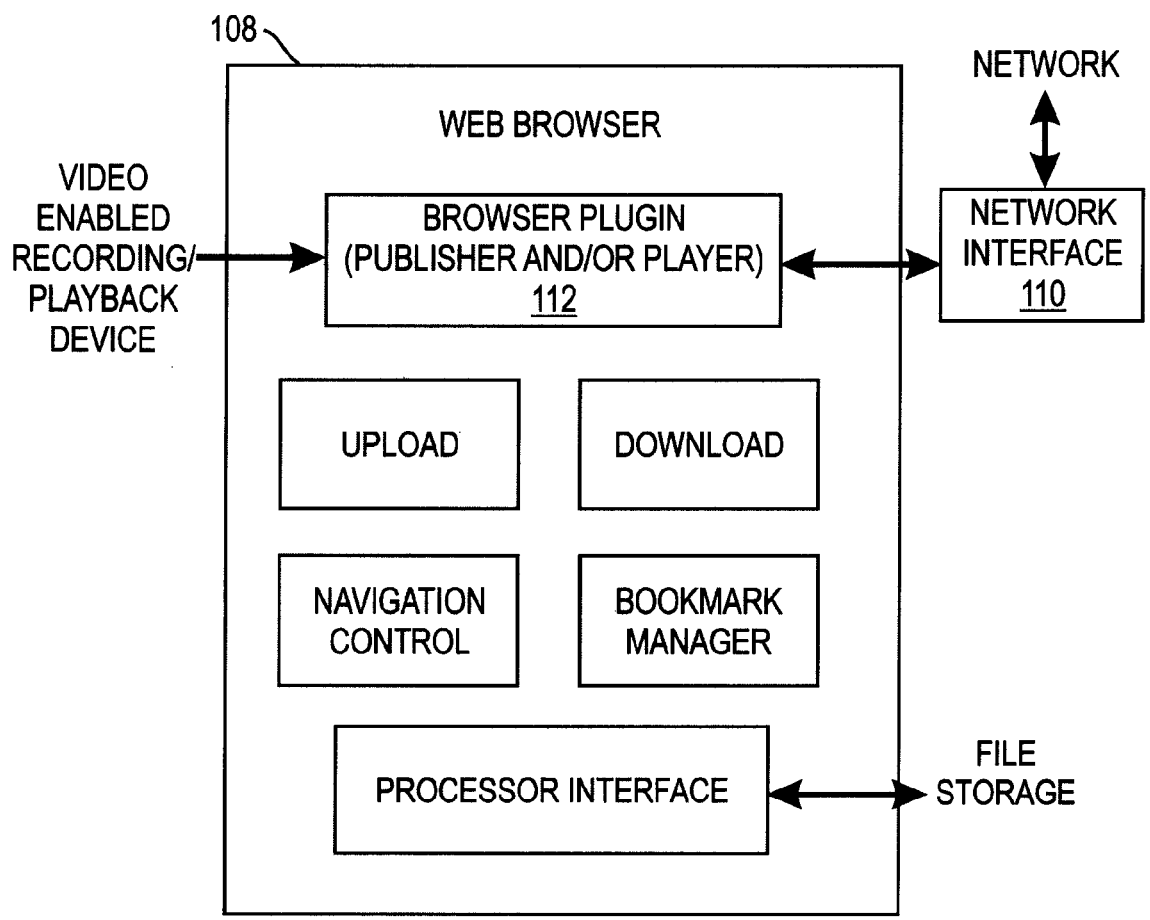
FIG. 2 illustrates a block diagram of an exemplary web browser 108, according to one embodiment.

FIG. 2 illustrates a block diagram of an exemplary web browser 108, according to one embodiment. The web browser 108 may host the publisher 112 and/or player 128 (e.g., as an integrated browser plug-in) and may provide for the interconnection of the publisher 112 with external components such as video enabled recording device(s) 132, the network 118, file storage (e.g., local storage such as database 114 and database 130, or network storage such as on the content delivery network 124) within a browser enabled processor platform 104. The browser 108 may provide upload and download functions through the network interface, for transfer of files to and from the browser enabled processor platform 104, provide user interface network navigation tools and provide other such network user interface tools. The web browser 108 may also provide for a web interface to the user with functions that include navigation control within web pages, bookmark management, favorite page storage and the like.

Figure 3:
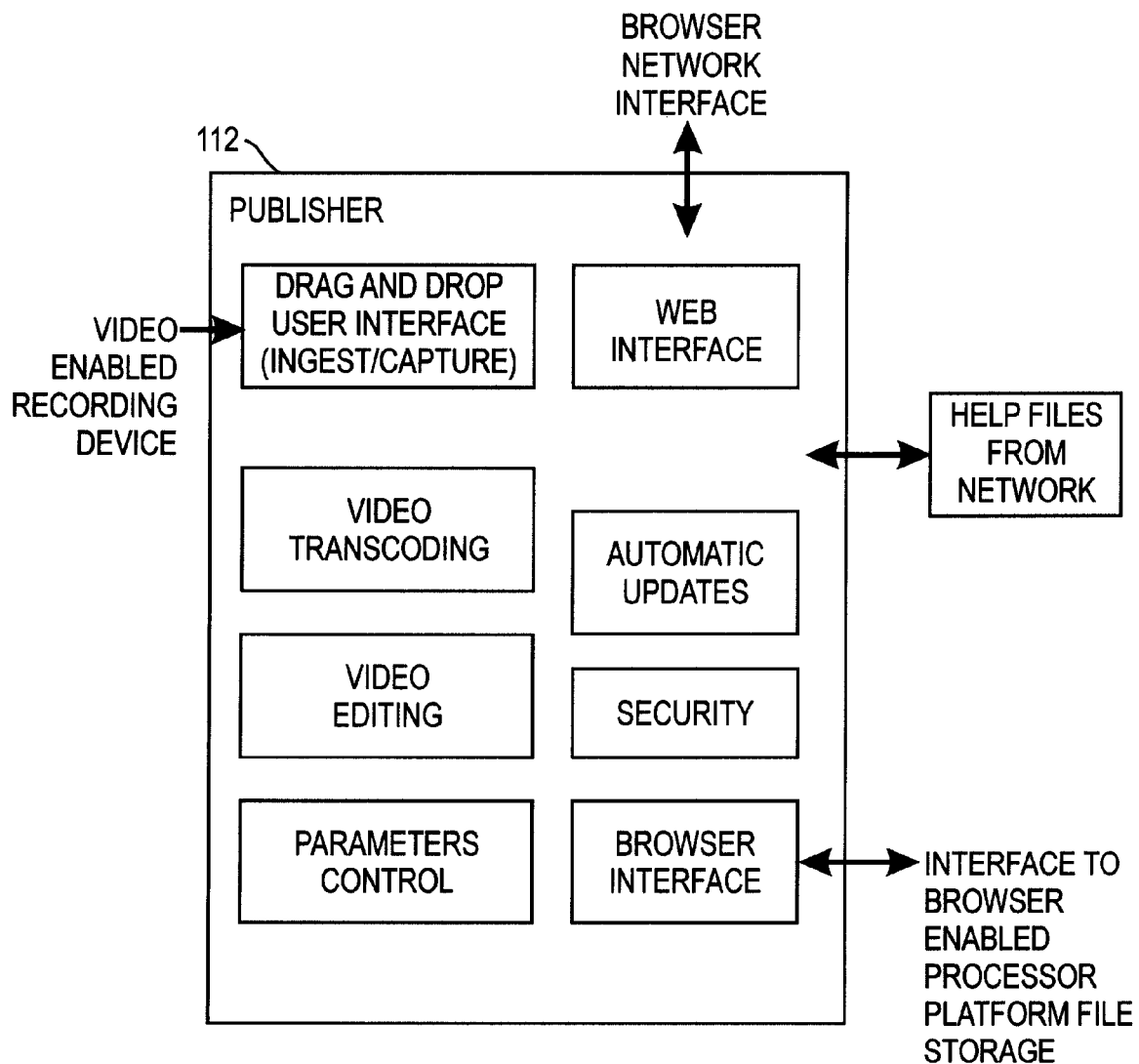
FIG. 3 illustrates a block diagram of an exemplary publisher 112, according to one embodiment.

FIG. 3 illustrates a block diagram of an exemplary publisher 112, according to one embodiment. The publisher 112 may provide for a 'drag-and-drop' style user interface through which video files from a video enabled recording/storage device 102 may be transferred to the publisher 112. Video files may then be transcoded into a format compatible with network posting and viewing where the user may utilize editing features of publisher 112 to modify the video file prior to uploading. The edited, transcoded or otherwise manipulated video file may then be transferred to the content delivery network 124 through the network interface 110A. Video files may also be transferred into the file storage 114 of the browser enabled processor platform 104 through the browser interface. The user may also control parameters that customize the user interface, receive interactive help from a publisher's help software module, and receive automatic updates to publisher 112 software modules. Security software modules may be incorporated to protect the system from disallowed activity.

Figure 4:
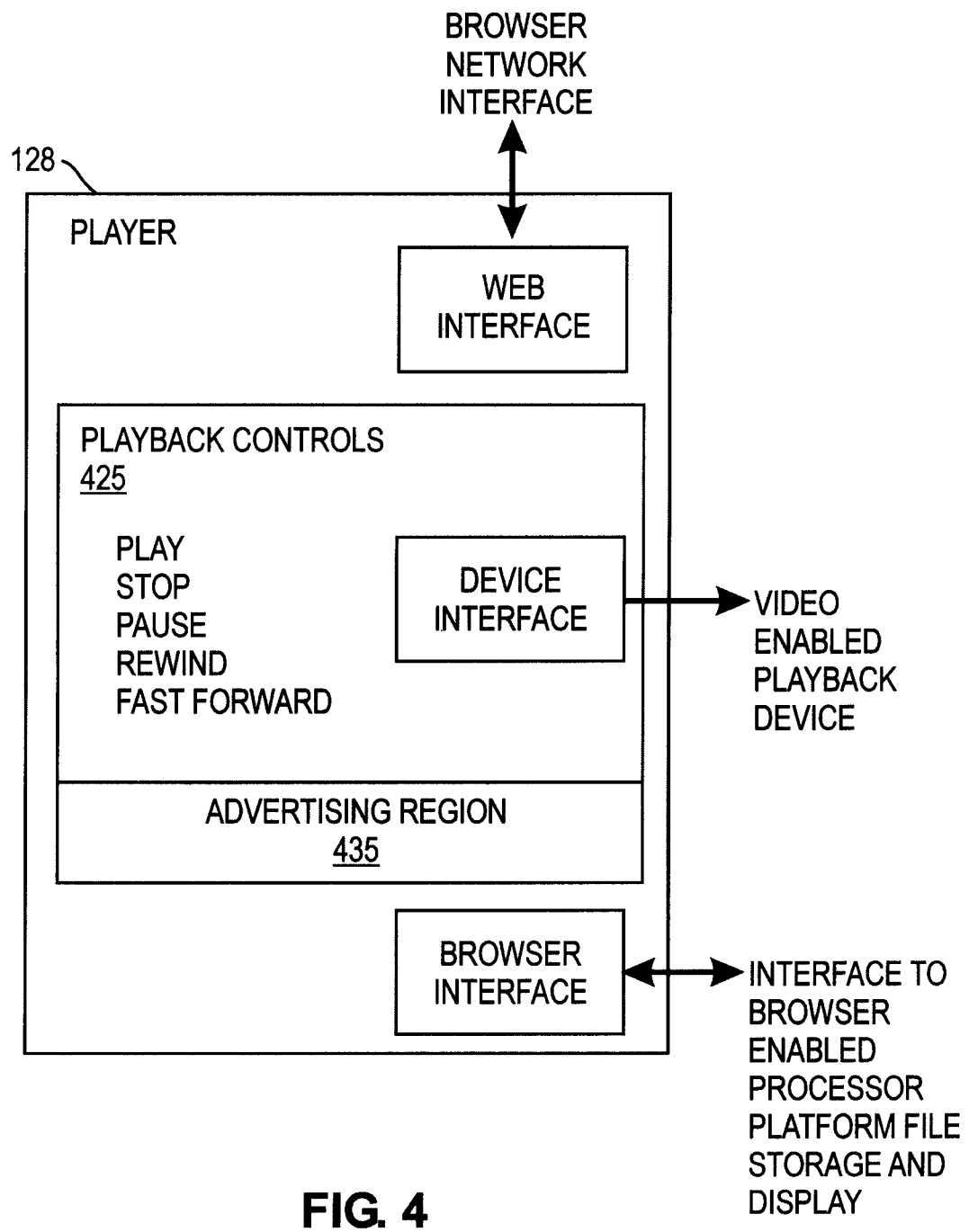
FIG. 4 depicts a block diagram of an exemplary player 128, according to one embodiment.

FIG. 4 depicts a block diagram of an exemplary player 128, according to one embodiment. The player 128 provides a user interface that allows the download, copying, viewing and interaction of video files previously stored on the content delivery network 124. Downloading of video files, or otherwise interacting with the files as described herein, is enabled through the player's web interface to the browser network interface. Video files may also be stored in the browser enabled processor platform 104 through the player's browser interface. Playback controls may be made available though typical VCR/DVR-type controls such as play, stop, pause, rewind, fast forward, copy, paste, cut, save, and other such control features.

The player 128 also includes an advertising region 435. Advertising messages are a part of a website's video viewing and/or video navigation interfaces. For example, an image of a cola bottle may travel across the bottom of the advertising region 435. In embodiments, these advertising messages are trigged by a user's interaction with an interaction prompt within advertising region 435. According to one embodiment, upon the user's interaction with the interaction prompt, an advertising message is presented. Continuing with the example, once the user clicks on the cola bottle a full video advertisement for the cola becomes available. Further interaction prompts may also be presented.

According to one embodiment, upon the user's interaction with the interaction prompt, the video viewing or navigation interface is placed in a suspended state. In other words, the video that the user was originally viewing pauses. In one embodiment, such pause may be for the duration of the advertising message, until a user action occurs or for another duration.

In one embodiment, interaction with the advertising message presents the user with the advertising message interaction prompt. The interaction prompt includes navigational controls that may be presented to the user during the advertising message. With the advertisement, the user is also presented with navigation controls to stop, pause, asset or window close (which is often represented by an X), sound-on, sound-off or other control that allows the user to change an aspect of the advertising message, conclude the advertising message, restart the advertising message, save or otherwise bookmark the advertising message, provide feedback on the advertising message or perform some other function. The navigational controls also allow the user to return to and resume viewing the video.

In one embodiment, the video viewing or navigation interface may be a flash-based video player 128, or other browser-based video player, adapted to deliver video content as a part of a website. The player 128 may also be a flash-based video navigation interface which allows users to select video content to view. In one embodiment, the interaction prompt in advertising region 435 may be a graphical element presented within the video viewing or navigation interface 425, informing the viewer that advertising content is available and encouraging the viewer to interact with the prompt to view the advertising. Such interactions may include mouse movement, click, keystroke, a combination of such inputs and/or some other form or forms of user input.

In one embodiment, the interaction prompt may take the form of a graphical, photographical, video or text asset. For example, the prompt may state "click here to watch ad." The interaction prompt may be presented statically or dynamically. The interaction prompt may present advertising messages in a similar way to the way the player 128 presents other, non-advertising, content. The interaction prompt may exhibit elements of interactivity by responding to user-inputs such as mouse-movements, mouse-position, clicks, keystrokes and other inputs. In one embodiment, the interaction prompt may appear before, during or after video playback. In one embodiment, multiple interaction prompts may be presented in association with a single piece of content and/or a single interaction prompt.

According to one embodiment, an advertising message in advertising region 435 includes text, picture, audio, graphical or video content presented to promote a product or service and/or encourage a user to interact with the advertising message.

In one embodiment, the advertising message presented in advertising region 435 directs the user's web-browser to a website or other user-resource or perform some other action.

Returning to FIG. 1, application servers 120

Figure 6:
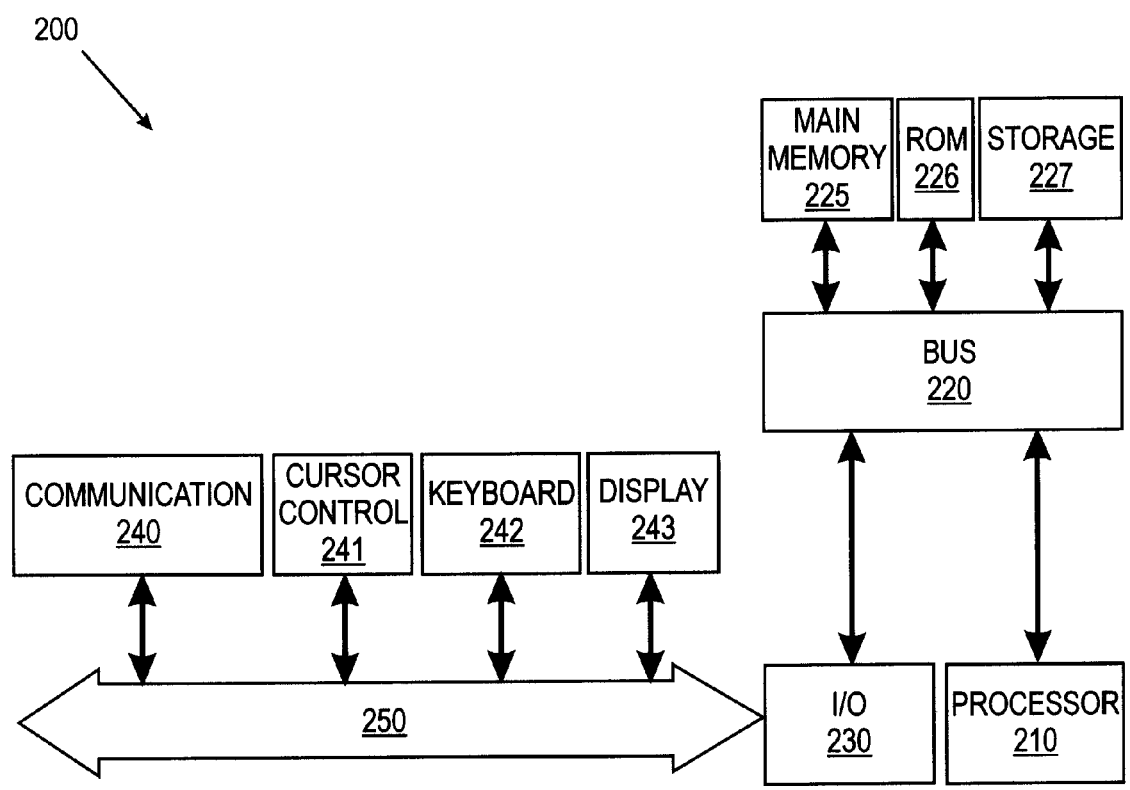
FIG. 6 illustrates an exemplary computer architecture for use with the present system, according to one embodiment.

In embodiments, as depicted in FIG. 6:

1. Instructions regarding the retrieval, handling, and presentation of video and/or other content, information, data, interaction prompt(s) (3, 3a, etc), advertising messages (5—not pictured) as well as other logic, instructions, information, parameters and/or commands may be passed to the video viewing or navigation interface (1) by the web page (10), referenced in a configuration file (11), hard-coded into the interface (1) and/or made available by some other mechanism.

2. Upon instantiation of the video viewing or navigation interface (1), or at some later point, the video viewing or navigation interface (1) may contact the advertising server (2). In embodiments, the video viewing or navigation interface (1) may also contact additional ad server(s) (2a), other content server(s) (4) and/or video storage server(s) (6). In embodiments, ad sever (2) may contact and/or receive content from content sever(s) (4) and/or video storage server(s) (6)

3. In response, the advertising server (2), other contacted servers such as other content server(s) (4) or video storage server(s) (6), may provide the video viewing or navigation interface (1) with any meta-data, content and/or other information, including information necessary to present interaction prompt (3) and/or any related advertising messages (5—not pictured), and may define the advertising message interaction action (9—not pictured). Additionally, video storage server (6), may provide video or other content to be presented by video viewing or navigation interface (1)

4. Upon receipt of the necessary information, or at some other point, video viewing or navigation interface (1) may present the appropriate information to the user as instructed, at which time the user's interaction or non-interaction with the interaction prompt(s), advertising messages (5), advertising message interaction action (9) and/or other user actions and/or information may be recorded and transmitted from video viewing or navigation interface (1) directly to reporting server (12), and/or to the ad server (2) and/or the video storage server (6) for re-transmission to reporting server (12) and/or use by other reporting/recording processes.

Figure 5:
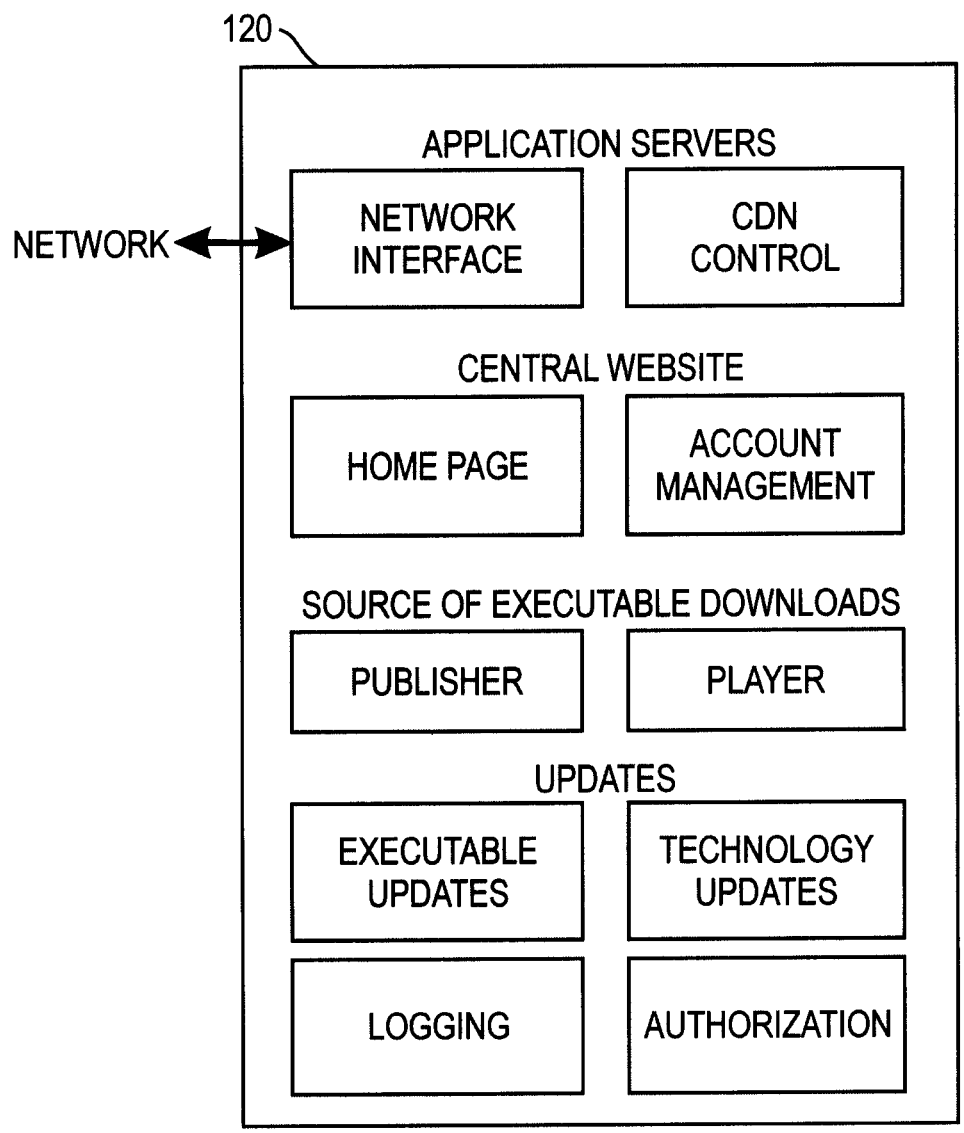
FIG. 5 depicts a block diagram of an exemplary application server(s) 120, according to one embodiment.

FIG. 5 depicts a block diagram of an exemplary application server(s) 120, according to one embodiment. The application server(s) 120 may provide central control of the certain system platform functions such as providing content deliver network 124 control, providing a central website for the a publisher's home page, providing account management, providing a source of executable downloads for the publisher 112 and player 128 browser plug-ins, providing automatic updates to publisher 112 and player 128 sites, providing logging of data flow and usage, providing authorization for use of the components of the system (such as uploading videos to the content deliver network 124), and providing other controls to facilitate the posting, editing, manipulating, and viewing of video files.

An embodiment of a process according to aspects of the present invention shall now be described. A client device may embed the publisher 112 directly in a client site using standard object/embed HTML tags. The client passes parameters in the HTML that control the appearance and functionality of the publisher. The publisher 112 checks for new modules that should be installed from the application servers 120 and performs any necessary or desired updates. A user may interact with the publisher 112 to select a source device and/or source file. The publisher 112 performs another round of updates, this time looking for updates required to use the specific file or device. If the device or file is unsupported, the publisher 112 may report the error to the application servers 120. The publisher 112 opens a connection to the content delivery network and authorizes itself. The publisher 112 transcodes the source video file and uploads it to the content delivery network 124, where it is made available for viewing via the player 128. The client embeds the player 128 directly into the document using HTML. The player 128 requests the file from the content delivery network 124 and begins playing back the video. The application servers 120 monitor traffic to the content delivery network 124, disabling files when they are no longer needed and generating reporting data for Clients.

In embodiments, a browser enabled processor platform 104 may be a microprocessor or microcontroller-based electronic device capable of supporting a browser application. The browser enabled processor platform 104 may have a CPU that executes software code for the basic operation of the device. The executable code may include an Operating System, programs, device drivers and other software components. Device drivers may include I/O device drivers and network interface drivers. A device driver may interface to a keypad or to a USB port. A network interface driver may execute protocols for the Internet, or an intranet, Wide Area Network (WAN), Local Area Network (LAN), Personal Area Network (PAN), extranet, or other network.

In embodiments, the browser enabled processor platform 104 may include a memory facility. The memory facility may contain transactional memory and/or long-term storage memory facilities. The memory facility may function as file or document storage, program storage, or working memory. A working memory facility may include, but is not limited to, static random access memory, dynamic random access memory, read-only memory, cache or Flash memory. A working memory facility may, for example, process temporally-based instructions, in part, by temporarily storing code relating to an action of a device and purging the information from the working memory facility in close temporal proximity to the completion of the action. A long-term memory facility may include, but is not limited to, a hard drive, portable drive, portable disk (e.g., a CD-ROM, DVD, etc.), tape facility, or other storage facility. A hardware memory facility may store a fixed information set (e.g., software code) including, but not limited to, a file, program, application, source code, object code, and the like.

In embodiments, the browser enabled processor platform 104 may contain hardware for converting analog signals to digital data, or for converting digital signals into analog signals. An example of converting an analog signal to digital data may be the conversion of an analog audio or video source into digital data for the storage of the audio or video information for subsequent storage, playback, conversion, transfer of the original audio to a digital, microprocessor-based system or to perform another function as described herein. Another example of converting an analog signal to digital data may be the conversion of analog signals from a light sensor device into digital data for the storage of visual information for subsequent storage, playback, or transfer of the original audio to a digital, microprocessor-based system. Visual information may be in the form of still images, icons, graphics, video images, or audio-video images, and the like.

The browser enabled processor platform 104 may have I/O interfaces. I/O interfaces may include a hardware network interface, displays, CD/DVD, video enabled recording/storage device video enabled recording/storage device 102, keypads/keyboards, printer, or other standard interfaces. An example of a hardware network interface may be a broadband connection, a dial-up connection, wireless, or other connection. An example of a display may be a monitor, plasma screen, or a liquid crystal display. An example of a video enabled recording/storage device video enabled recording/storage device 102 may be a digital camera 102A, digital video camera 102B, webcam/video capture board 102E, a cell phone 102C, personal digital assistant, pocket pc, notebook, and the like. An example of other standard interfaces may include, but is not limited to, a USB port, parallel port, serial port, microphone, or speaker.

A browser 108 may be a software application for navigating a network 118, such as the Internet, intranet, extranet, a private network, and or content in file systems. A browser 108 may be a software application that enables a user to display and interact with text, images, videos, audio and other content accessible through the network 118 (e.g., information typically located on a web page 122 at a website on the world wide web or a local area network). Text, images, video and other content (e.g., on a web page) may contain hyperlinks to navigate to other web pages at the same or different websites 122. Web browsers 108 may allow a user to navigate and access information provided on many web pages at many websites 122 by traversing these links. Web browsers 108 may also provide other features such as storing the address for a favorite website utilizing the browser's Bookmark Manager. Examples of bookmarked websites 122 may be hyperlinks to other personal sites, e-commerce sites, government sites, or educational sites. Another feature of web browsers 108 may be caching, where recently visited websites 122 are transferred through the processor interface and stored in processor memory to decrease retrieval time for subsequent calls for the website 122. Examples of web browsers 108 may be Microsoft Internet Explorer, Mozilla Firefox, Opera, Netscape, or Apple Safari. Although browsers 108 may typically be used to access the world wide web, they may also be used to access information provided by web servers in private networks or content in file systems.

Web browsers 108 may communicate with web servers through the network interface primarily using Hyper-Text Transfer Protocol (HTTP) to fetch webpages. HTTP may allow a web browser 108 to upload information across the network interface to web servers as well as download web pages from them. Webpages are located by means of a Uniform Resource Locator (URL), which may be treated as an address, beginning with http: for HTTP access. Many browsers 108 may support a variety of other URL types and their corresponding protocols. Examples of other URL types may be ftp: for File Transfer Protocol (FTP), rtsp: for Real-Time Streaming Protocol (RTSP), and https: for HTTPS (an SSL encrypted version of HTTP). The file format for a web page may be Hyper-Text Markup Language (HTML). Browsers may also support formats in addition to HTML. Examples of other support formats may be JPEG, PNG and GIF image formats, and can be extended to support more through the use of browser plug-ins. An example of a browser plug-in may be Macromedia's Flash or Apple's QuickTime. The combination of HTTP and URL protocol specification may allow web pages to have embedded images, animations, video, sound, and streaming media into the webpage, or make them accessible through the web page.

A publisher 112 may be provided in association with a browser enabled processor platform 104 and the publisher 112 may be designed as a browser plug-in or other integrated software component. The embedded software component may be adapted to 'plug-into' the browser 108 in such a way that the publisher 112 functionality is presented as functions within the browser 108. This may allow a user to launch or otherwise interface with a browser style application, which he may be very familiar with, and deploy the publisher 112 functionality without leaving the browser user interface. In embodiments, this may provide a consistent web style experience for the user. The user may be using the publisher 112 to convert a video file to a streaming format, edit the file, and post the file to a website 122 or other associated network location. Using systems and methods according to the present invention, the user may feel as if he is interacting with the Internet or other network 118 through a browser application, and manipulating the video files as desired all while interacting with the same familiar web browser style program. In embodiments, the user may ultimately intend to extract a video file from a video source or storage facility for editing and posting to a website 122 (as further described herein). The user may get the impression that he is accomplishing all or many of the functions while connected to and interfacing with the network 118. This may provide a seamless network experience because the user opens his interface to the network 118 (e.g., his browser application) and then works within that interface environment to manipulate and post his video on an intended website 122.

In embodiments, the publisher 112 may be an embedded browser plug-in. A plug-in may be a program that is designed to interact with another program to provide certain functions. The browser plug-in may be adapted to plug into, or otherwise interface with, a browser-style software application. In embodiments, the browser plug-in may be delivered through a CD, DVD, or portable drive, downloaded from an application server 120, provided with hardware, or otherwise provided. Examples of functions that plug-ins may provide include, but is not limited to, adding the capability of displaying specific graphic formats (e.g., SVG if the program doesn't support this format as apart of its standard functionality), to play multimedia files, to encrypt/decrypt email (e.g., PGP), or to filter images in graphic programs. A primary program, such as a web browser 108 or an email client, for example, may provide a way for plug-ins to register themselves with the program, and a protocol by which data is exchanged with plug-ins.

The functions that the publisher 112 plug-in may add to the standard browser functionality may include a user interface for receiving video from multiple sources, editing the video, encoding the video into a new format, and posting the video to a website 118. The publisher's web interface may be facilitated by the browser's network interface made through the browser enabled processor platform's 104 network connection. The publisher 112 may open a connection to a content deliver network 124 to upload the transcoded files to streaming servers. The publisher 112 browser plugin may provide secure handshake protocols and authentication with the application servers 120. Publisher 112 may also store files locally on the browser enabled processor platform 104 through the browser's interface.

The publisher 112 browser plug-in may supply a drag-and-drop interface to the browser's functionality that allows for simplified video encoding and posting of video files to a network 118. The drag-and-drop interface may provide for the receiving of video from a variety of sources. An example of a video source may be a webcam/video capture card 102E. The webcam/video capture card 102E may use start and stop capture buttons to control captures from these video devices. Since these devices do not provide integrated audio sources, publisher 112 may allow for the selection of an audio source from a dropdown list, and set audio record volume using a slider and an audio level meter. A preview window may display the live video stream. Another example of a video source may be a digital video camera 102B. The publisher 112 may capture video and audio directly from digital video cameras 102B, either capturing the live feed from the camera, or reading a stored video off a tape, for example. In the latter case, the publisher 112 may provide VCR/DVR-style controls that allow the user to queue up the tape. A 'StartCapture" button may begin capturing video and audio from the device, and a 'stop capture' button may end the capture. A preview window may display the video feed from the device. Another example of a video source may be a video enabled cellular phone 102C. Publisher 112 may also capture Email, MMS, SMS or other messaging from the cell phone 102C. A user may upload a video via a video message, downloaded video, video accessed via a browser 104, etc. from a video-enabled cell phone 102C. The user may be provided a unique numerical email, or other messaging code, or other address (e.g. 1234@xyz.com) to which to send the video message. The end user may send a video message to this address, where an SMTP server, and/or other configuration of server, will receive the message, parse the video file, and store it. The server may also store the association between the ID number (1234) and the path on the server of the stored video file. Once the email is received, the publisher 112 may automatically download the video file from the mail server. Other examples of a video and/or audio source may be a CD, DVD 102D, a cell phone 102C, personal digital assistant, pocket pc, notebook, and the like. The publisher 112 may read audio and video directly from a CD or DVD 102D, and read video files from still cameras, or other devices, that support video. The publisher 112 may also provide the ability to direct capture video from the source.

In embodiments, sources of video may use a wide variety of file formats which may complicate the process of posting video files onto a network 118. The publisher 112 browser plug-in may allow for the translation of one file format to another file format. Publisher 112 may choose a common file format to translate into in order to establish a standard for the service. The translation of code from one format to another is referred to as transcoding. Publisher 112 may transcode into a common format from a plurality of file formats. Some examples of these formats are: WMV, ASF, MPEG, 3GPP, 3GPP2, A-GIF, DV, FLIC, AMC, MPET1, MPEG2, MP4, MOV, VDU, WMV7, WMV8, MPG1, MPG4, CinPak, MSM45, MSM41, MSM42, MSM43, RVU9, ACLEP, MJPEG, Apl Ani, Apl Vid, MJPGA, MJPGB, H.261, H.263, comp V, DV-N, DV-Pal, DVCP-N, DVCP-P, MSVid1, SrVid2, SrVid3, Indeo3, Indeo5, and Flash 5.

FIG. 6 illustrates an exemplary computer architecture for use with the present system, according to one embodiment. Computer architecture 200 can be used to implement a server 120, websites 122, processing platforms 140, devices 102, and devices 132 of FIG. 1. One embodiment of architecture 200 comprises a system bus 220 for communicating information, and a processor 210 coupled to bus 220 for processing information. Architecture 200 further comprises a random access memory (RAM) or other dynamic storage device 225 (referred to herein as main memory), coupled to bus 220 for storing information and instructions to be executed by processor 210. Main memory 225 also may be used for storing temporary variables or other intermediate information during execution of instructions by processor 210. Architecture 200 also may include a read only memory (ROM) and/or other static storage device 226 coupled to bus 220 for storing static information and instructions used by processor 210.

A data storage device 227 such as a magnetic disk or optical disc and its corresponding drive may also be coupled to computer system 200 for storing information and instructions. Architecture 200 can also be coupled to a second I/O bus 250 via an I/O interface 230. A plurality of I/O devices may be coupled to I/O bus 250, including a display device 243, an input device (e.g., an alphanumeric input device 242 and/or a cursor control device 241).

The communication device 240 allows for access to other computers (servers or clients) via a network. The communication device 240 may comprise a modem, a network interface card, a wireless network interface or other well known interface device, such as those used for coupling to Ethernet, token ring, or other types of networks.

Player 128 makes a call to an ad manager 125 that exists in content delivery network 124. The ad manager 125 sends advertising code to the player 128. The player 128 tracks user events, such as each instance where the user pauses or plays the content, or when the content begins and ends. The ad server 135 provides the ad manager 125 in content delivery network 124 with an XML file. The XML file indicates to the ad manager 125:

- a pre-roll advertisement (e.g., an advertisement shown to the user before showing the content the user requested),
- a ticker advertisement (e.g., an advertisement shown in a ticker during the playback of the user requested content), and
- a post roll advertisement (e.g., an advertisement shown after the user completes viewing the desired content.)
- a mid roll advertisement (e.g., an advertisement shown in the middle of the desired content.)
- a menu advertisement (e.g., an advertisement show in an interface inside the video player where the user is selecting additional content or accessing additional functionality like emailing or embedding the player)

These various advertisements are constructed from reusable components. For example, the ticker advertisement is an animation, according to one embodiment. The content of the animation is downloaded from the content deliver network whose name and properties are specified dynamically from the XML file, such that a ticker size is defined, a title is defined and a URL of an image to appear in the ticker within advertising region 435.

The ad manager 125 is loaded into player 128 and performs scaling. According to one embodiment, the ad manager 125 is a Flash file (e.g., .swf) that is application specific. For example, if the advertising content to be served is video, a video handler is loaded into player 128. If the advertising content to be served is a slideshow, a slideshow handler is loaded into player 128. If the advertising content to be served is a FLV Flash video, a FLV Flash handler is loaded into player 128. If the advertising content to be served is a Netstream Flash video, a Netstream Flash handler is loaded into player 128. The ad server 135, ad manager 125, and content delivery network 124 allows interactive advertisements to be provided to a number of third party websites that host a player 128. The present method and system allows for ticker ads that may be interactive overlays on video that invite the user to watch the advertisers message.

An embodiment is comprised of a computer-implemented method, comprising storing digital advertising content, the digital content including digital video, and digital slideshows; serving an XML file from an ad server to a player embedded in a web site; generating one or more advertisements dynamically from the XML file and the digital content; and displaying the one or more advertisements with video content requested through the web site.

The computer-implemented method can further comprise providing a prompt to control displaying the one or more advertisements, wherein the prompt allows for pausing the one or more advertisements, playing the video content, and rewinding the one or more advertisements.

In an embodiment of the computer-implemented method, the XML file can include a title, a URL for advertising images, and a size of an advertising frame.

In an embodiment of the computer-implemented method, the one or more advertisements can include a pre-roll advertisement, a ticker advertisement, a menu advertisement and a post-roll advertisement.

An embodiment of the computer-implemented method can further comprise collecting user information and user viewing experience information; and providing the user information and the user viewing experience information to an advertising server.

An embodiment of the computer-implemented method can further comprise aggregating ad units at an advertising server, wherein the ad units are collected from one or more advertisers.

An embodiment of the computer-implemented method further comprises dynamically serving the one or more advertisements using the user information.

An embodiment of the computer-implemented method further comprises providing the user information and the user viewing experience information to one or more advertisers.

An embodiment of the computer-implemented method further comprises loading the player with an advertisement handler from the advertisement server, wherein the advertisement handler is specifically loaded based upon a format of the one or more advertisements.

Systems and methods for interaction prompt initiated video advertising have been described. It is understood that the embodiments described herein are for the purpose of elucidation and should not be considered limiting the subject matter of the present patent. Various modifications, uses, substitutions, combinations, improvements, methods of productions without departing from the scope or spirit of the present invention would be evident to a person skilled in the art.

We claim:

1. A computer-implemented method, comprising the steps of:
    storing digital advertising content on a server;
    storing a set of instructions on a client computer in communication with the server and a web site, the instructions specifying one or more properties of an interactive advertising region to be displayed on the client computer when the client computer is in communication with the web site;
    serving the digital advertising content from the server to the client computer for display on the client computer in response to a user of the client computer interacting with the interactive advertising region, the digital advertising content including at least an advertisement for display within a video player embedded in the web site, the video player including one or more video player control functions for controlling non-advertisement content played by the video player;
    displaying an interaction prompt on the client computer in response to the user interacting with the interactive advertising region, the interaction prompt including one or more playback control functions for controlling playback of the digital advertising content; and
    enabling the user to control playback of the digital advertising content with the one or more playback control functions provided by the interaction prompt.

2. The method of claim 1, wherein the web site includes a web site content that is displayed on the client computer, wherein the interactive advertising region overlays at least a portion of the web site content and invites the user to view the digital advertising content, and wherein interaction by the user with the interactive advertising region causes the digital advertising content to be displayed within the interactive advertising region.

3. The method of claim 2, wherein the web site content is inoperable while the digital advertising content is displayed.

4. The method of claim 1, wherein the interaction prompt includes a function for bookmarking the digital advertising content.

5. The method of claim 1, wherein the interaction prompt includes an email option that allows the digital advertising content to be emailed.

6. The method of claim 1, wherein the interaction prompt includes a feedback option that allows the user to provide feedback on the digital advertising content.

7. The method of claim 1, wherein the interaction prompt includes a save option that allows the user to save the digital advertising content.

8. The method of claim 1, wherein the interaction prompt includes a link to a URL for a web site of an advertiser associated with the digital advertising content.

9. The method of claim 1, wherein the interaction prompt includes concluding the digital advertising content and restarting the digital advertising content.

10. The method of claim 1, wherein the server includes an advertisement server and a content delivery network, further comprising the steps of:
    collecting information about the user with the content delivery network;
    serving the information about the user from the content delivery network to the advertisement server; and
    matching one or more advertisements to the user based on the information about the user.

11. The method of claim 1, further comprising the step of dynamically sizing the interaction prompt when displayed on the client computer to fit at least a portion of the digital advertising content.

12. The method of claim 1, wherein the interaction prompt is dynamically displayed on the client computer.

13. The method of claim 1, wherein the server includes an advertisement server and a content delivery network, wherein the step of storing a set of instructions includes the step of loading the set of instructions to the client computer from the advertisement server, and wherein the step of serving the digital advertising content includes the step of loading the digital advertising content to the client computer from the content delivery network based on the set of instructions.

* * * * *